US009722528B2

(12) United States Patent
Ueda

(10) Patent No.: US 9,722,528 B2
(45) Date of Patent: Aug. 1, 2017

(54) MOTOR CONTROL DEVICE

(71) Applicant: MITSUBISHI ELECTRIC CORPORATION, Chiyoda-ku (JP)

(72) Inventor: Koichiro Ueda, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/771,389

(22) PCT Filed: Mar. 5, 2014

(86) PCT No.: PCT/JP2014/055689
§ 371 (c)(1),
(2) Date: Aug. 28, 2015

(87) PCT Pub. No.: WO2014/185123
PCT Pub. Date: Nov. 20, 2014

(65) Prior Publication Data
US 2016/0020721 A1 Jan. 21, 2016

(30) Foreign Application Priority Data

May 16, 2013 (JP) ................. 2013-104344

(51) Int. Cl.
*H02P 3/14* (2006.01)
*H02P 27/06* (2006.01)
(Continued)

(52) U.S. Cl.
CPC ............... *H02P 27/06* (2013.01); *H02P 3/18* (2013.01); *H02P 3/22* (2013.01); *H02P 5/74* (2013.01); *H02P 6/34* (2016.02)

(58) Field of Classification Search
CPC .. H02P 3/14; H02P 3/12; H02P 29/024; H02P 3/18; H02P 27/06
(Continued)

(56) References Cited

U.S. PATENT DOCUMENTS 4,667,776 A * 5/1987 Nomura .................. B66B 1/308
187/289
8,040,097 B2 10/2011 Iwashita et al.
(Continued)

FOREIGN PATENT DOCUMENTS

EP 2 506 423 A2 10/2012
JP 2009-292155 A 12/2009
(Continued)

OTHER PUBLICATIONS

International Search Report issued on May 13, 2014 for PCT/JP2014/055689 filed on Mar. 5, 2014.

*Primary Examiner* — Bickey Dhakal
(74) *Attorney, Agent, or Firm* — Oblon, McClelland, Maier & Neustadt, L.L.P.

(57) ABSTRACT

A motor control device includes a power-consumption calculator that calculates a power loss L according to a motor current I or according to the motor current I and a motor velocity v, and calculates a motor output W from a product of the motor velocity v and a torque τ or thrust force, to determine whether a regenerative resistance is in an energized state. When the regenerative resistance is in an energized state, if a total value W+L of the power loss L and the motor output W is equal to or greater than 0 (W+L≥0), the power-consumption calculator calculates a power consumption P as W+L, and if a total value W+L of the power loss L and the motor output W is less than 0 (W+L<0), the power-consumption calculator calculates the power consumption P=0.

23 Claims, 10 Drawing Sheets

(51) Int. Cl.
*H02P 3/22* (2006.01)
*H02P 5/74* (2006.01)
*H02P 3/18* (2006.01)
*H02P 6/34* (2016.01)

(58) Field of Classification Search
USPC .......................................................... 318/376
See application file for complete search history.

(56) References Cited

U.S. PATENT DOCUMENTS

| | | |
|---|---|---|
| 8,786,229 B2 | 7/2014 | Yamaguchi et al. |
| 8,884,565 B2 | 11/2014 | Tezuka et al. |
| 2007/0216340 A1* | 9/2007 | Iura .......................... H02P 27/06 318/801 |
| 2010/0117568 A1* | 5/2010 | Iwashita ................ H02P 21/14 318/400.02 |

FOREIGN PATENT DOCUMENTS

| | | |
|---|---|---|
| JP | 2010-081679 A | 4/2010 |
| JP | 2011-019333 A | 1/2011 |
| JP | 2012-125888 A | 7/2012 |
| JP | 2012-217317 A | 11/2012 |
| JP | 2012-222890 A | 11/2012 |
| JP | 2012-253892 A | 12/2012 |

* cited by examiner

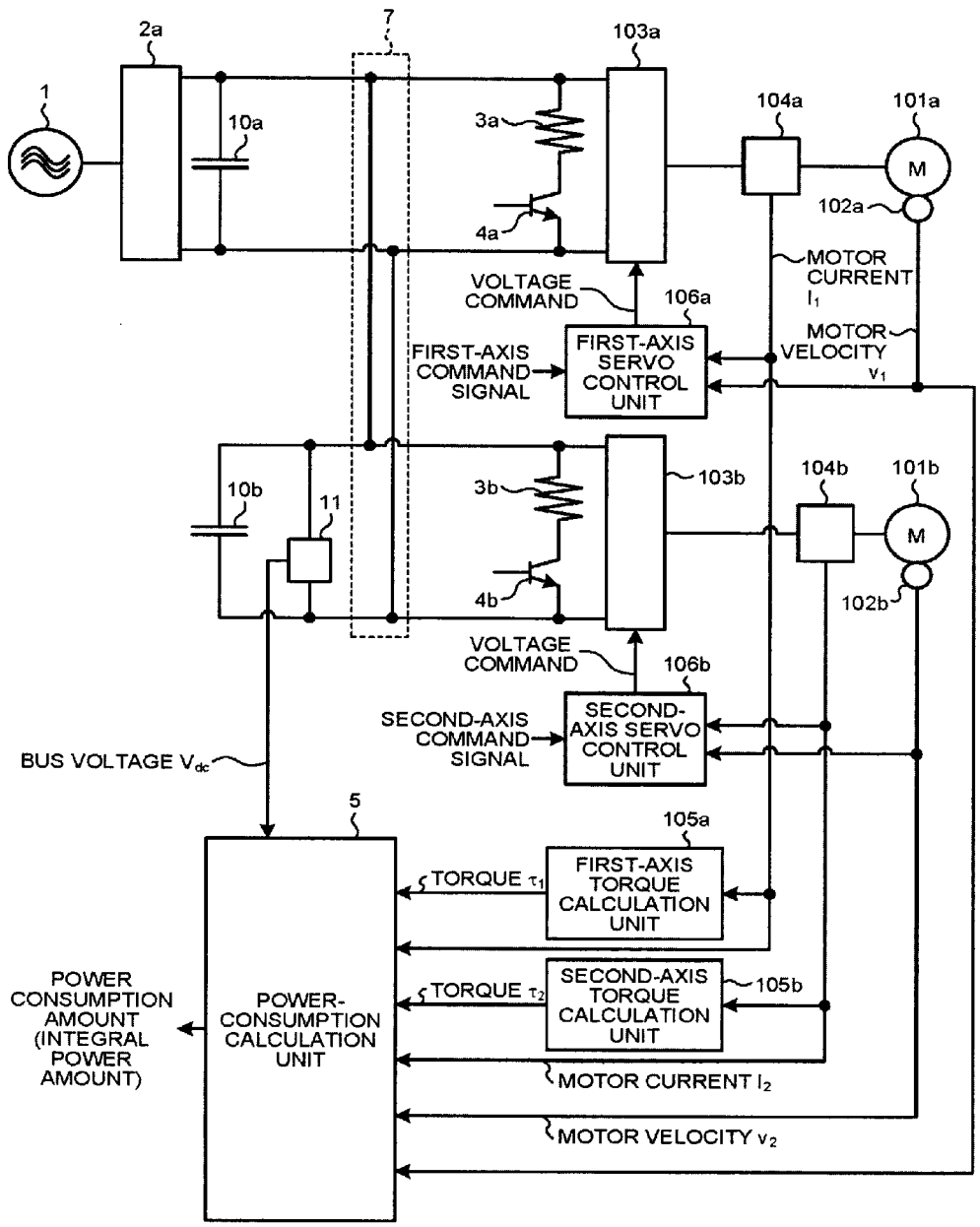

MOTOR CONTROL DEVICE

FIELD

The present invention relates to a motor control device.

BACKGROUND

A motor driving device such as a servo amplifier is categorized, in terms of the method for processing regenerative power (energy) produced at the time of driving the motor, into a power-supply regeneration type in which regenerative power is returned to a power supply, and a resistance regeneration type in which regenerative power is consumed by a regenerative resistance (a regenerative brake). The resistance-regeneration-type motor driving device is different from the power-supply-regeneration-type motor driving device in that it is not necessary to provide a dedicated circuit that returns regenerative power to the power supply (such as a power-supply regenerative converter). Therefore, the resistance-regeneration-type motor driving device is more advantageous in that the hardware cost is lower than the power-supply-regeneration-type motor driving device, and has been widely used as a motor driving device for driving an industrial machine.

Meanwhile, there has conventionally been a demand for accurately gasping the power consumption when a motor driving device drives the motor without providing a costly dedicated measurement device such as a power meter. This is because grasping the power consumption accurately makes it possible to accurately identify electricity cost at the time of driving the motor, and to appropriately select the capacitance of power source facility.

In order to solve the problem as described above, Patent Literature 1, for example, discloses a technique for a resistance-regeneration-type motor driving device that is supplied with power from a common power-supply unit, and that drives a plurality of axes, in which a total value of outputs of the respective axes is calculated, and when the total value is negative, the power amount is considered as zero to calculate the overall power consumption. In Patent Literature 1, when the total value of outputs of the respective axes is negative, the power amount is considered as zero, and a process is performed assuming that the amount of power corresponding to this negative value is consumed by a regenerative resistance.

CITATION LIST

Patent Literature

Patent Literature 1: Japanese Patent Application Laid-open No. 2010-81679

SUMMARY

Technical Problem

However, in a motor driving device that is equipped with a regenerative resistance, regenerative power, produced such as when the motor performs a decelerating operation, is not entirely consumed by the regenerative resistance, but can be partially accumulated in a smoothing capacitor provided in a motor control device. While the power consumed by the regenerative resistance results in a loss, the power accumulated in the smoothing capacitor is reusable. When this reusable power is calculated as a loss, the power consumption cannot be accurately calculated.

The conventional technique described above does not take into account the amount of this power accumulated in the smoothing capacitor. Therefore, the conventional technique has a problem in that the power consumption at the time of driving the motor cannot be calculated accurately.

The present invention has been achieved to solve the above problems, and an object of the present invention is to provide a motor control device that controls a resistance-regeneration-type motor driving device, and that is capable of accurate power calculation without using any dedicated measurement device such as a power meter.

Solution to Problem

In order to solve the aforementioned problems, a motor control device according to one aspect of the present invention is constructed to include: a rectifying unit that converts power from an AC power supply to DC power, and outputs the DC power; a smoothing capacitor for main-circuit smoothing that is connected to an output of the rectifying unit; a regenerative resistance, one terminal of which is connected to one of electrodes of the smoothing capacitor, and which consumes regenerative power; an inverter unit that converts DC power output from the rectifying unit to AC power suitable for driving a motor; a current detection unit, which is connected between the motor and the inverter unit and detects a motor current of the motor; a velocity calculation unit that calculates a motor velocity of the motor; a torque calculation unit that calculates a torque or thrust force of the motor according to the motor current; a servo control unit that provides a voltage command to the inverter unit from various types of command information; and a power-consumption calculation unit that calculates a power loss based on the motor current or based on the motor current and the motor velocity, and calculates a motor output obtained from a product of the motor velocity and the torque or thrust force, so as to determine whether or not the regenerative resistance is in an energized state, wherein when the regenerative resistance is in an energized state, if a total value of the power loss and the motor output is equal to or greater than 0, the power-consumption calculation unit calculates power consumption as the total value, and when the total value of the power loss and the motor output is negative, the power-consumption calculation unit calculates the power consumption as 0, and when the regenerative resistance is not in an energized state, the power-consumption calculation unit calculates the power consumption as the total value of the power loss and the motor output.

Advantageous Effects of Invention

According to the present invention, the motor control device can be provided that is capable of accurate power calculation without using any dedicated measurement device such as a power meter.

BRIEF DESCRIPTION OF DRAWINGS

FIG. 10 is a block diagram illustrating a configuration example of the motor control device according to the fourth embodiment.

DESCRIPTION OF EMBODIMENTS

Exemplary embodiments of a motor control device according to the present invention will be explained below in detail with reference to the accompanying drawings. The present invention is not limited to the embodiments.

First Embodiment

Figure 1:
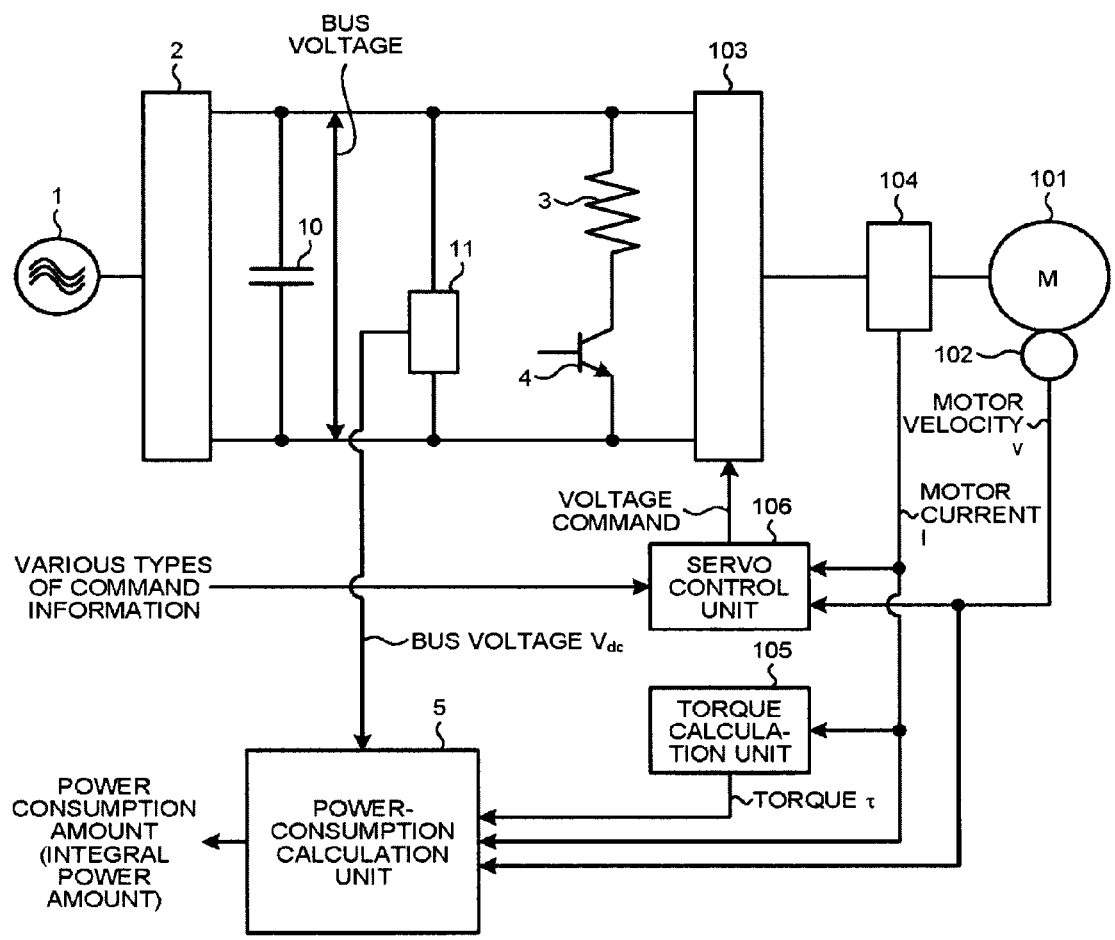
FIG. 1 is a block diagram illustrating a configuration example of a motor control device according to a first embodiment.

FIG. 1 is a block diagram illustrating a configuration example of a motor control device according to a first embodiment of the present invention. The motor control device illustrated in FIG. 1 is connected to an AC power supply 1, and includes a rectifier 2, a smoothing capacitor 10, a bus-voltage measurement unit 11, a regenerative resistance 3, a regenerative transistor 4, a power-consumption calculation unit 5, an inverter 103, a current detection unit 104, a servo control unit 106, and a torque calculation unit 105. The motor control device controls a motor 101 provided with an encoder 102. The encoder 102 is an example of a velocity calculation unit.

The AC power supply 1 (for example, a three-phase AC power supply) is connected to the rectifier 2 (for example, a diode stack). AC power supplied from the AC power supply 1 is rectified, and the rectified power is smoothed by the smoothing capacitor 10 to output a DC voltage.

n the subsequent stage of the smoothing capacitor 10, the bus-voltage measurement unit 11 is connected. A bus voltage $V_{dc}$ measured by the bus-voltage measurement unit 11 is output to the power-consumption calculation unit 5.

In the subsequent stage of the bus-voltage measurement unit 11, the regenerative resistance 3 and the regenerative transistor 4 (a regenerative switch) are connected. The regenerative resistance 3 and the regenerative transistor 4 are connected in series. When regenerative power is produced and the voltage of DC power supply increases to a threshold value, then the regenerative transistor 4 is activated to perform a regenerative operation by consuming the regenerative power in the regenerative resistance 3.

In the subsequent stage of the regenerative resistance 3 and the regenerative transistor 4, the inverter 103 is connected. The inverter 103 is connected to the motor 101 through the current detection unit 104. As an example of the inverter 103, a PWM inverter can be raised.

The motor 101 includes the encoder 102. The encoder 102 detects a motor velocity v and a position of the motor 101, and outputs them to the power-consumption calculation unit 5 and the servo control unit 106.

The current detection unit 104 detects a motor current I of the motor 101, and outputs the detected motor current I to the servo control unit 106, the torque calculation unit 105, and the power-consumption calculation unit 5.

The servo control unit 106 calculates, based on various types of command information (such as a position command, a velocity command and a current command that serve as a reference signal for an operation of the motor 101), a voltage command for causing the motor 101 to generate a current required for the motor 101 to follow, and outputs the voltage command to the inverter 103. Based on the voltage command, DC power is supplied to the motor 101. In the servo control unit 106, a feedback control system is configured, for example, such that command information follows the position, velocity and current, which are detected values.

The torque calculation unit 105 calculates a torque τ of the motor 101 from the motor current I of the motor 101, detected by the current detection unit 104, and outputs the calculated torque τ to the power-consumption calculation unit 5. The torque calculation unit 105 calculates the torque τ when the motor current I is detected. Specifically, when there is a proportional relation between the torque τ and the motor current I, the torque calculation unit 105 calculates the torque τ from τ=$K_t$·I, where $K_t$ represents a torque constant.

When a synchronous motor is used as the motor 101, the torque constant is made equal to an induced voltage constant. Therefore, instead of the torque constant, the induced voltage constant can be used. Even when there is not a proportional relation between the torque τ and the motor current I, the torque τ still depends on the motor current I. Therefore, when there is not a proportional relation between the torque τ and the motor current I, the relation between the motor current I and the torque τ to be generated can be stored in advance as a table or function in order to calculate the torque τ in accordance with this table or function. That is, when a table or function that represents the relation between the motor current I(t) and the torque τ(t) is represented as F(I), τ=F(I) holds. Therefore, it is sufficient that the torque calculation unit 105 has a table or function that represents the relation between the torque constant k(t) or the motor current I(t) and the torque τ(t) stored therein.

The power-consumption calculation unit 5 calculates and outputs a power consumption amount (or the integral power amount) based on the bus voltage $V_{dc}$ measured by the bus-voltage measurement unit 11, information such as the motor velocity v and the position of the motor 101, which are detected by the encoder 102, the motor current I of the motor 101, detected by the current detection unit 104, and the torque τ calculated by the torque calculation unit 105.

Figure 2:
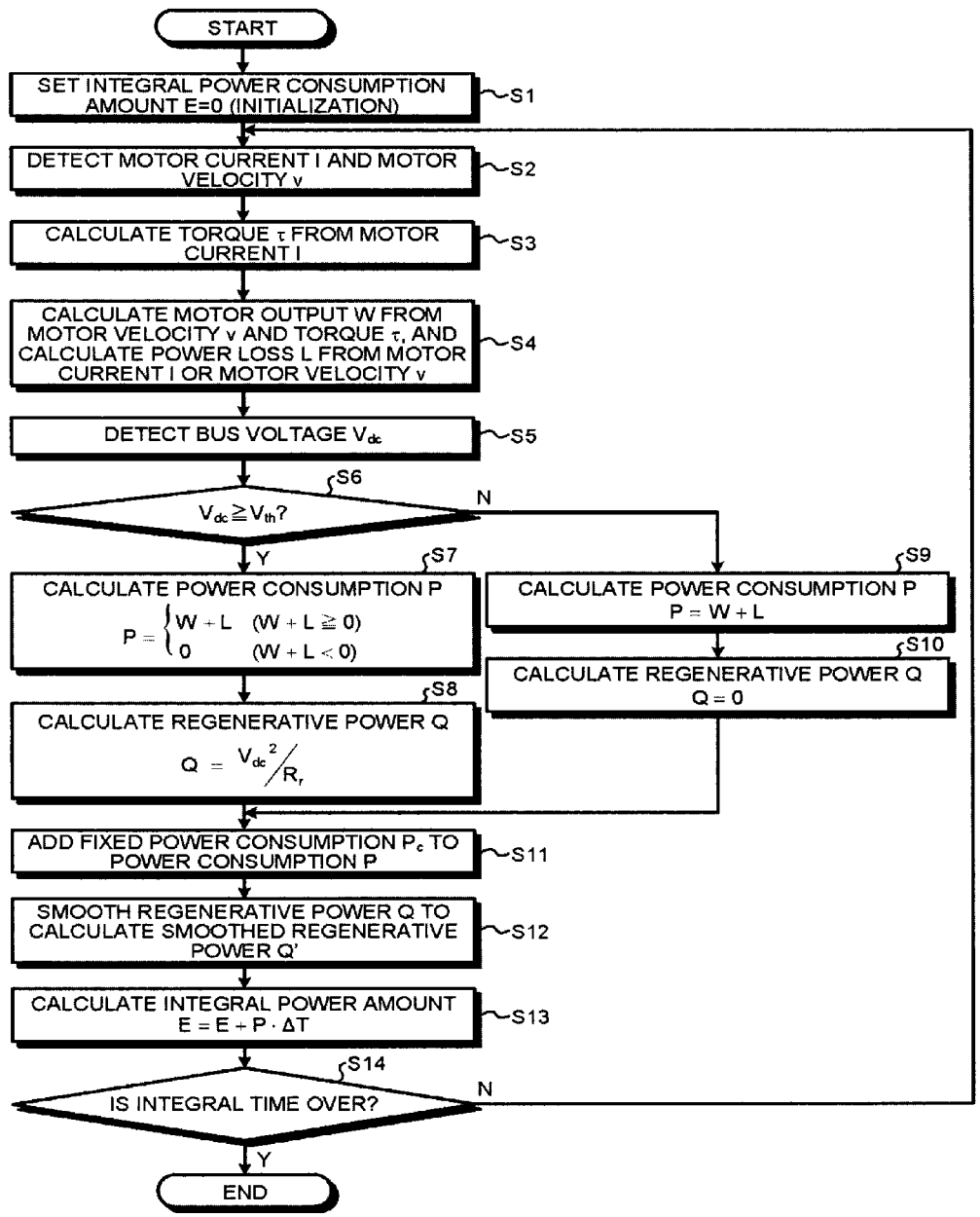
FIG. 2 is a flowchart for explaining an operation example of the motor control device according to the first embodiment.

Next, an operation of the motor control device at the time of driving the motor 101 is described with reference to FIG. 2. FIG. 2 is a flowchart for explaining an operation example of the motor control device according to the first embodiment of the present invention.

First, the power-consumption calculation unit 5 sets an integral power amount E to be 0 (Step S1).

Next, the current detection unit 104 detects the motor current I, and the encoder 102 detects the motor velocity v (Step S2). The processes in step S2 and the subsequent steps are performed at every sampling time LT.

Next, the torque calculation unit 105 calculates the torque τ on the basis of the motor current I detected by the current detection unit 104 (Step S3). As described above, the torque τ can be calculated by taking advantage of the fact that the torque τ depends on the motor current I.

Next, the power-consumption calculation unit 5 calculates a motor output W from the motor velocity v detected by the encoder 102, and from the torque τ calculated by the torque calculation unit 105, and then calculates a power loss L from the motor velocity v and the motor current I detected by the current detection unit 104 (Step S4).

The motor output W is calculated form W=v·τ.

For the power loss L caused due to the driving of the motor 101, a copper loss $L_c$ and an iron loss $L_i$ can be raised. The copper loss $L_c$ is energy lost by an electrical resistance of a coil in the motor 101. The iron loss $L_i$ is energy lost when a core wound with the coil in the motor 101 is magnetized by an alternating current.

The copper loss $L_c$ can be calculated by the following equation (1) by using a motor winding resistance R.

[Equation 1]

$$L_c = R \cdot I^2 \quad (1)$$

The iron loss $L_i$ is a sum of a hysteresis loss and an eddy-current loss. On the basis of a magnetic flux density B of the motor 101, and the motor velocity v, the iron loss $L_i$ can be expressed as $L_i = \alpha' \cdot v \cdot B^\gamma + \beta' \cdot v^2 \cdot B^2$, where $\alpha'$, $\beta'$, and $\gamma$ are constants of proportionality. Further, by taking advantage of the fact that the magnetic flux density B is substantially proportional to the motor current I, and by using other constants of proportionality α and β, the iron loss $L_i$ can be expressed by the following equation (2).

[Equation 2]

$$L_i = \alpha \cdot v \cdot I^\gamma + \beta \cdot v^2 \cdot I^2 \quad (2)$$

Therefore, the iron loss $L_i$ depends not only on current, but also on velocity. α, β, and γ can be obtained by performing an electromagnetic field analysis of the motor 101.

The power loss L caused due to the driving of the motor 101 is a sum of the copper loss $L_c$ and the iron loss $L_i$, and therefore it can be expressed by the following equation (3).

[Equation 3]

$$L = L_c + L_i = R \cdot I^2 + \alpha \cdot v \cdot I^\gamma + \beta \cdot v^2 \cdot I^2 \quad (3)$$

These equations and various constants (such as the motor winding resistance R and the constants α, β, and γ) are stored in the power-consumption calculation unit 5.

A power loss caused in an inverter and a rectifying unit can further be added to the above power loss L.

In the above descriptions, the power loss L made up of the copper loss $L_c$ and the iron loss $L_i$ is calculated by the equation (3), where the copper loss $L_c$ is generated in proportion to the square of the motor current I, and the iron loss $L_i$ is generated depending on both the motor velocity v and the motor current I. However, the calculation of the power loss L is not limited thereto, and other calculation methods can be also used as long as the calculation method is expressed by a calculation formula and a constant for modeling a power loss. In a case of using a motor with a sufficiently-low iron loss $L_i$, the iron loss $L_i$ is negligible.

Next, the bus-voltage measurement unit 11 detects the bus voltage $V_{dc}$ (Step S5).

Subsequently, the power-consumption calculation unit 5 compares to detect whether or not the bus voltage $V_{dc}$ calculated in step S5 is equal to or greater than a threshold value (Step S6). As an example of the threshold value, a voltage at which the regenerative transistor 4 is set to ON, that is, a threshold voltage $V_{th}$ can be raised. When the bus voltage $V_{dc}$ is equal to or greater than the threshold voltage $V_{th}$ of the regenerative transistor 4, the regenerative transistor 4 is set to ON, and regenerative power is consumed by the regenerative resistance 3. When the bus voltage $V_{dc}$ is equal to or greater than the threshold voltage $V_{th}$ of the regenerative transistor 4, the operation of the motor control device shifts to Step S7. When the bus voltage $V_{dc}$ is less than the threshold voltage $V_{th}$ of the regenerative transistor 4, the operation of the motor control device shifts to Step S9.

<When Shifting to Step S7>

The power-consumption calculation unit 5 calculates a power consumption P by the following equation (4) based on whether the sum of the motor output W and the power loss L, which are calculated in step S4, is equal to or greater than 0, or is negative (Step S7).

[Equation 4]

$$P = \begin{cases} W + L & (W + L \geq 0) \\ 0 & (W + L < 0) \end{cases} \quad (4)$$

Next, the power-consumption calculation unit 5 calculates regenerative power Q as $Q = V_{dc}^2 / R_r$ (Step S8), where a resistance value $R_r$ is a resistance value of the regenerative resistance 3. The resistance value $R_r$ is stored in the power-consumption calculation unit 5. Thereafter, the operation of the motor control device shifts to Step S11.

<When Shifting to Step S9>

The power-consumption calculation unit 5 uses the motor output W and the power loss L, which are calculated in step S4, to calculate the power consumption P by the following equation (5) (Step S9).

[Equation 5]

$$P = W + L \quad (5)$$

The power-consumption calculation unit 5 then sets the regenerative power Q to 0 (Q=0) (Step S10). Thereafter, the operation of the motor control device shifts to Step S11.

<After Shifting to Step S11>

Next, the power-consumption calculation unit 5 adds a fixed power consumption $P_c$ to the power consumption P calculated in step S7 or Step S9, to calculate the overall power consumption (Step S11). The fixed power consumption $P_c$ refers to power to be consumed by a motor driving device that cannot use regenerative power even when it is produced. For example, when the servo control unit 106 is a microprocessor, the fixed power consumption $P_c$ is power consumption of the microprocessor. When the fixed power consumption $P_c$ is very low with respect to the power consumption P so that it is negligible, the fixed power consumption $P_c$ is considered as $P_c=0$, and Step S11 can be omitted.

Next, the power-consumption calculation unit 5 smoothes the regenerative power Q in terms of time to calculate smoothed regenerative power Q' (Step S12). It is sufficient that the smoothing is performed by using a first-order lag filter or a moving average filter.

Subsequently, the power-consumption calculation unit 5 integrates the power consumption P to calculate the integral power amount E with the following equation (6) (Step S13).

[Equation 6]

$$E = E + P \cdot \Delta T \quad (6)$$

Next, the power-consumption calculation unit 5 determines whether an integral time for calculating the integral power amount E has elapsed (Step S14). If the integral time for calculating the integral power amount E has elapsed, the process is finished. If the integral time has not yet elapsed, the operation of the motor control device returns to Step S2.

As described above, according to the flowchart in FIG. 2, the integral power amount E is calculated, which is a sum total of power amounts consumed during the integral time from the start of the process.

Furthermore, according to the flowchart in FIG. 2, the power consumption P, the regenerative power Q, average regenerative power Q', and the integral power amount E used by a motor and a motor driving device from the start of the process to the present point in time, can be obtained at every sampling time $\Delta T$.

The reasons why the power consumption of the motor and the motor driving device is accurately calculated are described below.

In step S4, in general, when a motor is being operated, a copper loss or an iron loss is generated, where the power loss $L \geq 0$, and further when the motor accelerates, the sign of a velocity coincides with the sign of a torque, and therefore the motor output W becomes greater than 0 (W>0), while when the motor decelerates, the sign of a velocity does not coincide with the sign of a torque, and therefore the motor output W becomes less than 0 (W<0).

When the process flow branches off to "N" in step S6, that is, when the bus voltage $V_{dc}$ is less than the threshold voltage $V_{th}$, and the regenerative resistance 3 is not in an energized state, if W is larger than 0 (W>0), a total sum of power of the motor output W and the power loss L is consumed. Accordingly, the power consumption P is P=W+L. As a matter of course that P=W+L becomes greater than 0 (P=W+L>0), and thus power is consumed in total.

When W<0 and W+L>0, regenerative power produced by a motor is partially compensated for a power loss. Because power represented as "W+L" is consumed in total, the power consumption P is P=W+L.

When W<0 and W+L<0, power is not consumed in total, but power is produced. Because a regenerative resistance is not in an energized state, power is accumulated between bus-bars (in the smoothing capacitor 10). Also in this case, the power consumption P is calculated as P=W+L. Therefore, the power consumption P becomes less than 0 (P=W+L<0), which indicates that power is produced.

That is, when the process flow branches off to N in step S6, the power consumption P is P=W+L in any case (Step S9). Further, because the regenerative resistance 3 is not in an energized state, the regenerative power Q is Q=0 (Step S10).

When the process flow branches off to "Y" in step S6, that is, when the bus voltage $V_{dc}$ is equal to or greater than the threshold voltage $V_{th}$, and the regenerative resistance 3 is not in an energized state, then if W+L is equal to or larger than 0 (W+L≥0), power is consumed in total. Accordingly, the power consumption P is P=W+L, but if W+L is less than 0 (W+L<0), regenerative power is produced. However, this regenerative power is consumed by the regenerative resistance 3, and therefore the power consumption P becomes equal to 0 (P=0 (Step S7). Further, because the regenerative resistance 3 is in an energized state, based on the bus voltage $V_{dc}$ and the resistance value $R_r$ of the regenerative resistance 3, a current $V_{dc}/R_r$ flows through the regenerative resistance 3. Therefore, the regenerative power Q is $Q=V_{dc} \cdot (V_{dc}/R_r) = V_{dc}^2/R_r$ (Step S8).

Note that the smoothing capacitor 10 can accumulate therein power according to its capacitance. As the power accumulated in the smoothing capacitor 10a increases, the voltage across the smoothing capacitor 10 increases according to its capacitance. That is, the bus voltage $V_{dc}$ increases. When the bus voltage $V_{dc}$ increases to the threshold voltage $V_{th}$ of the regenerative transistor 4, regenerative power is consumed by the regenerative resistance 3.

According to the configuration of the present invention, the bus voltage $V_{dc}$ is monitored successively (at every predetermined sampling time), and while whether regenerative power is accumulated in the smoothing capacitor 10, or is consumed by the regenerative resistance 3, is determined, the power consumption is calculated. This makes it possible to accurately calculate the power consumption.

When the power consumption P is calculated in the manner as described above, the integral power amount E, calculated by integrating the power P, is also calculated more accurately.

In step S11, the fixed power consumption $P_c$ is added to the power consumption P. The fixed power consumption $P_c$ is the amount of power to be consumed by an electronic component (for example, a microprocessor) of the motor control device, which cannot use regenerative power even when the regenerative power is produced.

For example, in a case in which an electronic component that cannot use this regenerative power is a microprocessor, it is possible to calculate a specific fixed power consumption $P_c$ in advance from the specifications of the microprocessor. It is preferable to store this calculated value in the power-consumption calculation unit 5.

As described above, in step S11, even when the regenerative transistor 4 is set to ON, and regenerative power is consumed by the regenerative resistance 3, the power consumption of an electronic component that cannot use regenerative power is still added as the fixed power consumption $P_c$. Therefore, the power consumption P can be calculated accurately.

In step S12, the regenerative power Q is smoothed to calculate the smoothed regenerative power Q'. The reasons for this are as follows. When the bus voltage $V_{dc}$ is changed in the proximity of the threshold voltage $V_{th}$ of the regenerative transistor 4 at every sampling time, the process flow is switched between branching off to "Y" and "N" at every sampling time in step S6. Therefore, the regenerative power Q is switched between 0 and a value that is not 0 at every sampling time. This makes it difficult to intuitively identify whether the regenerative power Q has been produced. Accordingly, the regenerative power Q is smoothed by using a first-order lag filter, a moving average filter, or other filters to calculate the smoothed regenerative power Q' in order to identify average regenerative power. When it is desired to identify the average regenerative power without smoothing the regenerative power Q, Step S12 can be omitted.

As a typical example in which the motor control device described above accurately calculates power information, particularly, the integral power amount, a case in which a positioning operation is periodically performed multiple times using a motor is described in more detail.

When the motor accelerates from a stopping state, and performs a constant-velocity operation, the sign of a motor torque that is an acceleration toque, and a friction torque coincides with the sign of a velocity. Therefore, the motor output W is always positive. However, when the motor starts a decelerating operation, the direction of the motor torque and the direction of the velocity are opposite to each other, and therefore the motor output W becomes negative.

Furthermore, when the sum of the motor output W and the power loss L becomes negative (W+L<0), regenerative power is produced, however, this regenerative power is not immediately consumed by the regenerative resistance 3. The regenerative power is first accumulated in a smoothing capacitor within the motor control device, and accordingly the bus voltage $V_{dc}$ increases. When the bus voltage $V_{dc}$ becomes equal to or greater than the threshold voltage $V_{th}$ of the regenerative transistor 4, the regenerative transistor 4 is set to ON, and the regenerative power is partially consumed by the regenerative resistance 3. Therefore, the bus voltage $V_{dc}$ decreases.

When the bus voltage $V_{dc}$ does not become equal to or greater than a set voltage (the threshold voltage $V_{th}$ in the present embodiment) of the regenerative transistor 4, the regenerative transistor 4 is not set to ON, and the regenerative power is continuously been accumulated between the bus-bars (in the smoothing capacitor 10). In either case, immediately after the motor decelerates and stops, a part or all of the regenerative power remains between the bus-bars (in the smoothing capacitor 10).

Next, after the motor decelerates, and is completely stopped, when a positioning operation is performed again, a part or all of the regenerative power produced at the time of the last positioning operation is used for an accelerating operation. As described previously, this regenerative power has been accumulated in the smoothing capacitor. When the integral power amount is calculated assuming that regenerative power is entirely consumed by the regenerative resistance 3, there is a deviation between the actual integral power amount and the calculated integral power amount. However, according to the present invention, when regenerative power is produced, the integral power amount E is calculated taking into account whether the regenerative power is accumulated in the smoothing capacitor 10 (the power consumption P is calculated as negative), or is consumed by the regenerative resistance 3 (the power consumption P is calculated as 0). This makes it possible to accurately calculate the power consumption P, and the integral power amount E obtained by integrating the power consumption P.

That is, one of the characteristics of the present invention is to perform case analysis by determining whether or not the regenerative resistance 3 is in an energized state, and to change the method for calculating the power consumption P and the regenerative power Q.

In the present embodiment, there has been described an exemplary case where the encoder 102 is attached to the motor 101, and the encoder 102 can directly detect the velocity of the motor 101. However, another configuration can be also employed, in which the velocity of the motor 101 is not directly detected, but is estimated from information such as a current that flows through the motor 101 or an interphase voltage of the motor 101, and the estimated velocity is used as velocity information.

In the present embodiment, there has been described a case where the motor 101 is a rotary motor. However, a linear motor can be also used. In this case, thrust force of the linear motor corresponds to a torque of the rotary motor. Because the thrust force of the linear motor depends on the motor current I, it is adequate that thrust force constant $K_t$ is used, or a table or function F is used, to calculate the thrust force of the linear motor.

Second Embodiment

In the first embodiment, it is determined, based on whether the bus voltage $V_{dc}$ is greater than a set voltage (the threshold voltage $V_{th}$) of the regenerative transistor 4, whether the regenerative resistance 3 is in an energized state. However, the present invention is not limited thereto. In a second embodiment of the present invention, there is described a method for determining whether the regenerative resistance 3 is in an energized state other than the determination method using a magnitude relation between the bus voltage $V_{dc}$ and the threshold voltage $V_{th}$ of the regenerative transistor 4.

Figure 3:
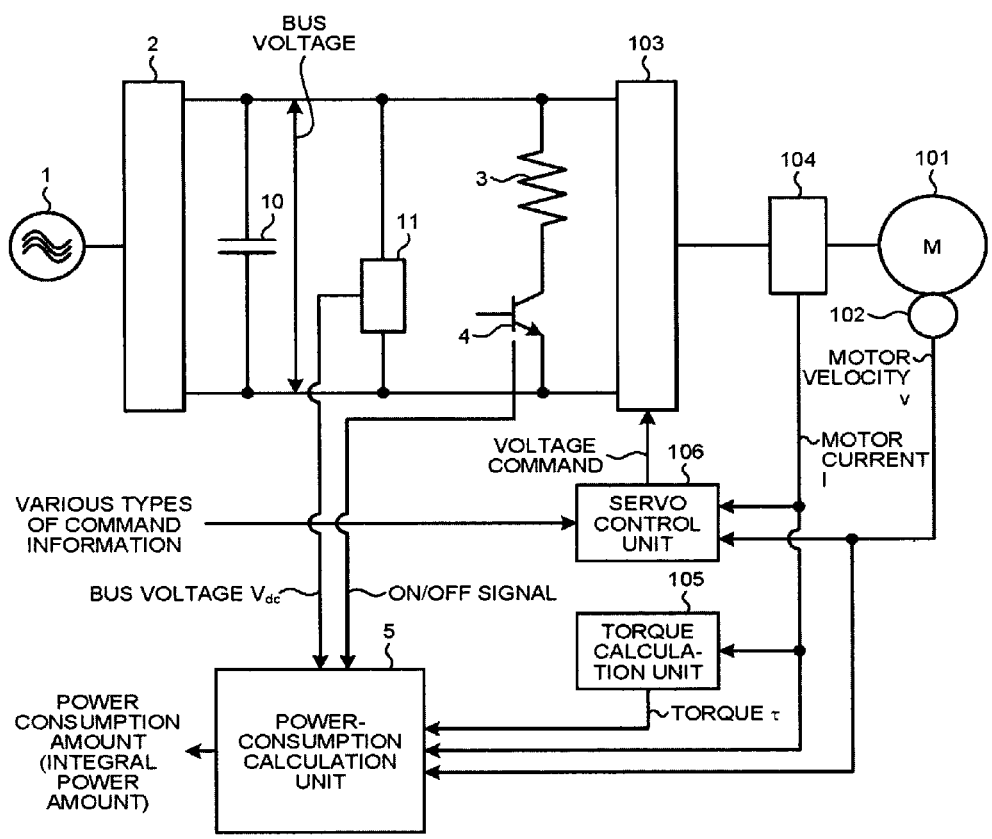
FIG. 3 is a block diagram illustrating a configuration example of a motor control device according to a second embodiment.
Figure 4:
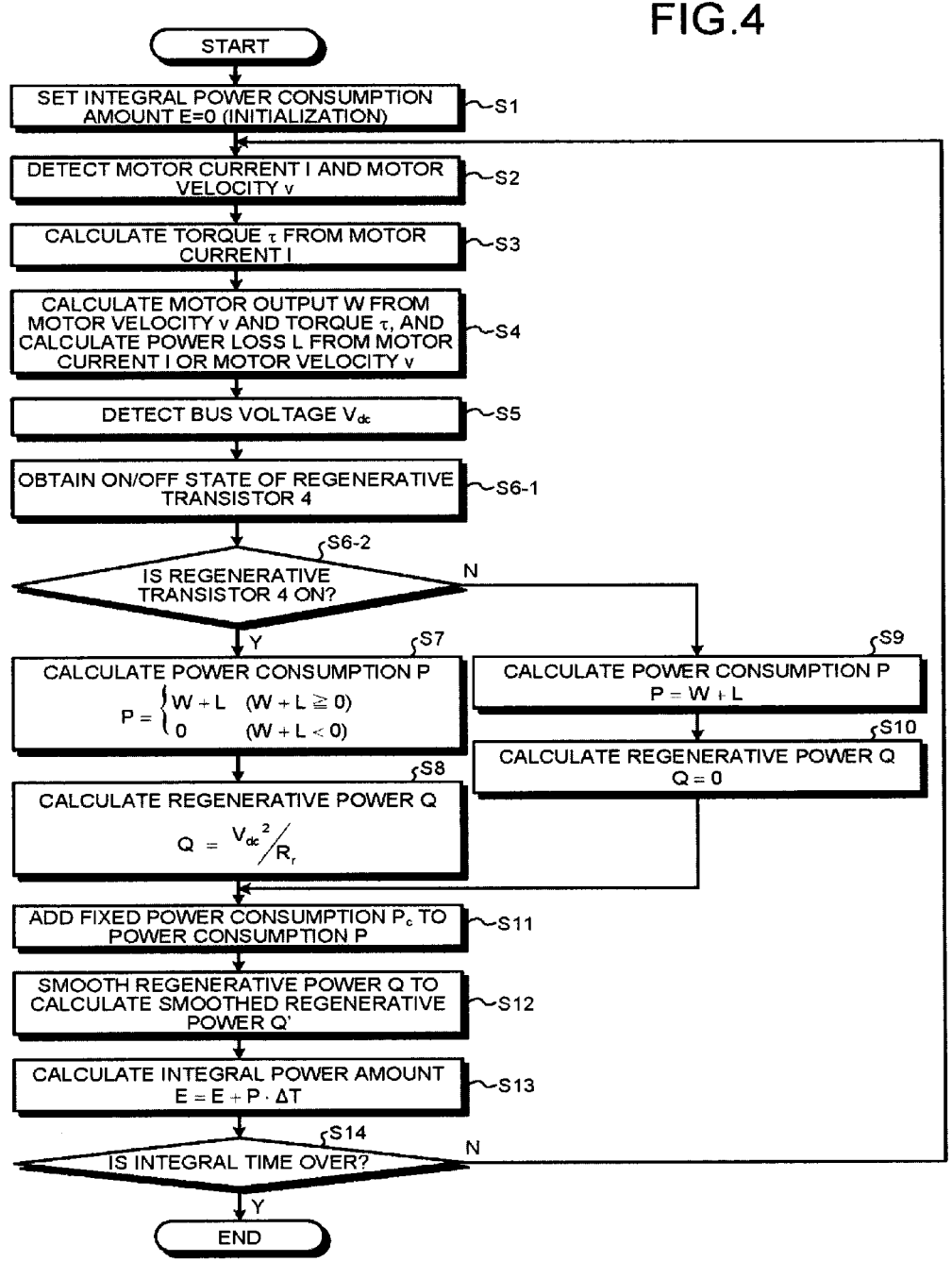
FIG. 4 is a flowchart for explaining an operation example of the motor control device according to the second embodiment.

FIG. 3 is a block diagram illustrating a configuration example of a motor control device according to the second embodiment of the present invention. FIG. 3 is different from FIG. 1 in that an ON/OFF state signal of the regenerative transistor 4 is obtained. FIG. 4 is a flowchart for explaining an operation example of the motor control device according to the second embodiment of the present invention. In the present embodiment, points different from those illustrated in FIG. 2 are focused and described.

First, Steps S1 to S5 are identical to those in FIG. 2 in the first embodiment. In the present embodiment, after Step S5, an ON/OFF state of the regenerative transistor 4 is obtained (Step S6-1). The power-consumption calculation unit 5 then determines whether the regenerative transistor 4 is in an ON state based on the ON/OFF state of the regenerative transistor 4 obtained in step S6-1 (Step S6-2). When the regenerative transistor 4 is ON, the operation of the motor control device shifts to Step S7. When the regenerative transistor 4 is not ON, the operation of the motor control device shifts to Step S9. After shifting to Step S7 or Step S9, the processes are identical to those in FIG. 2 in the first embodiment.

As described above, in FIG. 4, whether the regenerative resistance 3 is in an energized state is determined based on whether the regenerative transistor 4 is in an ON state. When the regenerative transistor 4 is in an ON state, the regenerative resistance 3 is in an energized state. When the regenerative transistor 4 is in an OFF state, the regenerative resistance 3 is not in an energized state.

In the present embodiment, similarly to the first embodiment, taking into account the regenerative power to be accumulated in the smoothing capacitor 10, the power consumption P, the regenerative power Q, and the integral power amount E can be calculated accurately.

As described above, in the first embodiment, whether or not the regenerative resistance 3 is in an energized state is determined based on the bus voltage $V_{dc}$, while in the present embodiment, whether the regenerative resistance 3 is in an energized state is determined based on whether the regenerative transistor 4 is in an ON/OFF state. That is, when the regenerative transistor 4 is ON, the power-consumption calculation unit 5 determines that the regenerative resistance 3 performs a regenerative operation. Also, when the regenerative transistor 4 is OFF, the power-consumption calculation unit 5 determines that the regenerative resistance 3 does not perform a regenerative operation. However, the present invention is not limited thereto. For example, it is sufficient that a regenerative load ratio that represents the ratio of regenerative power to allowable regenerative power is calculated to determine whether the regenerative resistance 3 is in an energized state based on the regenerative load ratio. That is, it is sufficient that when the regenerative load ratio is 0, the regenerative resistance 3 is determined not to be in an energized state. Also, when the regenerative load ratio is greater than 0, the regenerative resistance 3 is determined to be in an energized state.

Third Embodiment

In the first and second embodiments, the motor control device has been described, in which one inverter is provided to one rectifying unit and one smoothing capacitor to drive one motor. However, the present invention is not limited thereto. In a third embodiment of the present invention, a motor control device is described, in which a plurality of inverters are provided to one converter to drive a plurality of motors.

Figure 5:
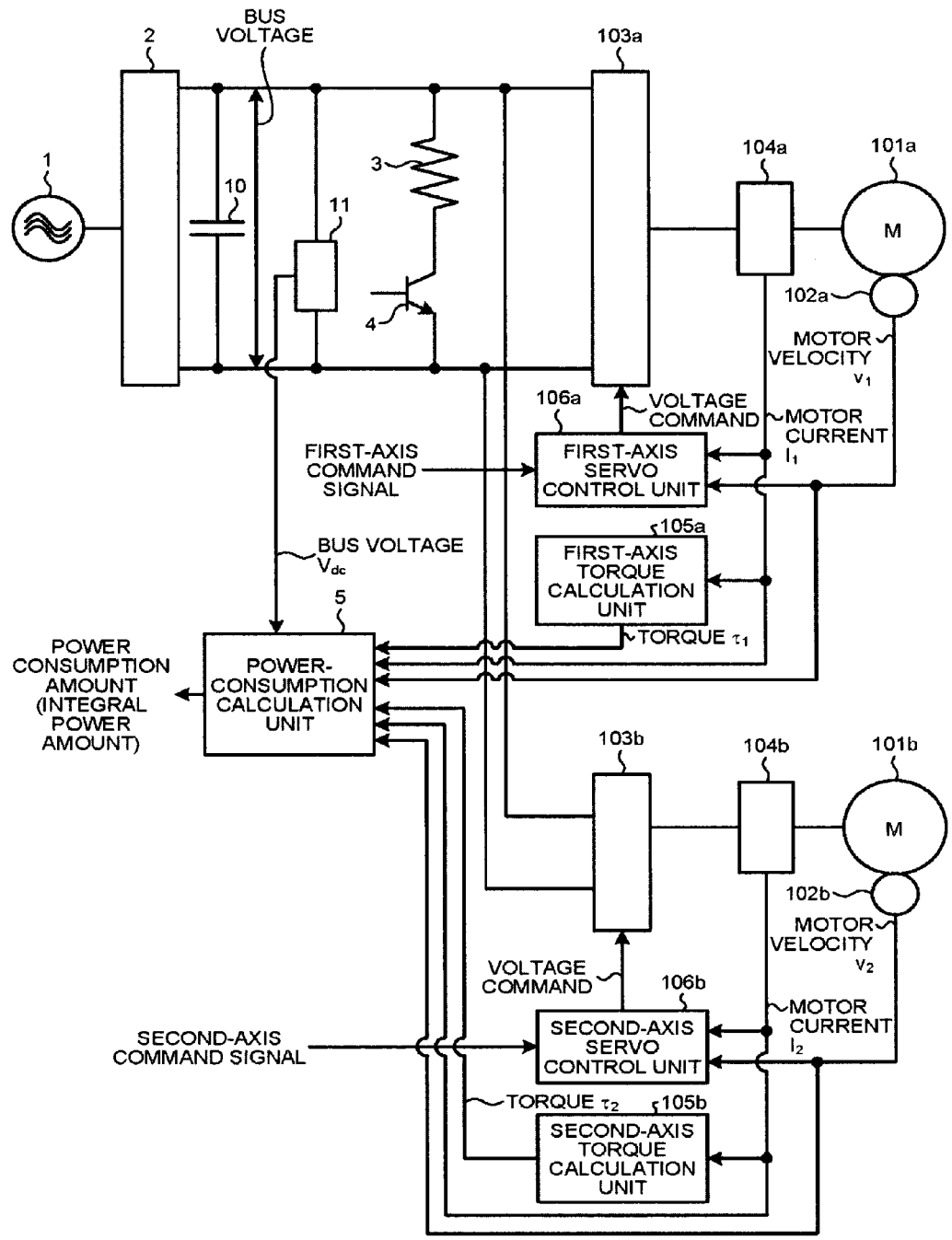
FIG. 5 is a block diagram illustrating a configuration example of a motor control device according to a third embodiment.

FIG. 5 is a block diagram illustrating a configuration example of the motor control device according to the third embodiment. In the motor control device illustrated in FIG. 5, a second motor 101b provided with a second encoder 102b, a second inverter 103b, a second current detection unit 104b, a second-axis torque calculation unit 105b, and a second-axis servo control unit 106b, are added, as compared to the motor control device illustrated in FIG. 1.

A first motor 101a illustrated in FIG. 5 is identical to the motor 101 illustrated in FIG. 1. A first encoder 102a illustrated in FIG. 5 is identical to the encoder 102 illustrated in FIG. 1. A first inverter 103a illustrated in FIG. 5 is identical to the inverter 103 illustrated in FIG. 1. A first current detection unit 104a illustrated in FIG. 5 is identical to the current detection unit 104 illustrated in FIG. 1. A first-axis torque calculation unit 105a illustrated in FIG. 5 is identical to the torque calculation unit 105 illustrated in FIG. 1. A first-axis servo control unit 106a illustrated in FIG. 5 is identical to the servo control unit 106 illustrated in FIG. 1.

The first inverter 103a supplies a current to the first motor 101a from a DC power supply generated by a rectifying unit and a smoothing capacitor. The second inverter 103b also supplies a current to the second motor 101b from the DC power supply generated by a rectifying unit and the smoothing capacitor.

The first current detection unit 104a detects a motor current $I_1$ of the first motor 101a. The second current detection unit 104b also detects a motor current $I_2$ of the second motor 101b.

The first-axis torque calculation unit 105a calculates a torque $\tau_1$ generated in the first motor 101a from the motor current $I_1$. The second-axis torque calculation unit 105b calculates a torque $\tau_2$ generated in the second motor 101b from the motor current $I_2$. The first-axis torque calculation unit 105a and the second-axis torque calculation unit 105b function similarly to the torque calculation unit 105. However, when the first motor 101a and the second motor 101b are connected, the first-axis torque calculation unit 105a and the second-axis torque calculation unit 105b have stored therein a table or function that represents a relation between the torque constant $K_t$ or the motor current $I(t)$ and the torque $\tau(t)$, corresponding to the first motor 101a and the second motor 101b, respectively.

The first-axis servo control unit 106a controls the first-axis motor 101a, and calculates a first-axis voltage command for causing the first motor 101a to generate a current required for the first motor 101a to follow a first-axis command signal (a position command, a velocity command, and a current command) that serves as a reference signal for an operation of the first motor 101a. The second-axis servo control unit 106b controls the second motor 101b, and calculates a second-axis voltage command for causing the second motor 101b to generate a current required for the second motor 101b to follow a second-axis command signal (a position command, a velocity command, and a current command) that serves as a reference signal for an operation of the second motor 101b.

The configuration illustrated in FIG. 5 is different from the configuration illustrated in FIG. 1 in that two inverters and two motors are connected to an output of one rectifying unit.

The power-consumption calculation unit 5 calculates and outputs a power consumption amount based on the bus voltage $V_{dc}$ measured by the bus-voltage measurement unit 11, information such as a motor velocity $v_1$ and a position of the first motor 101a detected by the first encoder 102a, and a motor velocity $v_2$ and a position of the second motor 101b detected by the second encoder 102b, based on the motor current $I_1$ of the first motor 101a, detected by the first current detection unit 104a, the motor current $I_2$ of the second motor 101b detected by the second current detection unit 104b, the torque $\tau_1$ calculated by the first-axis torque calculation unit 105a, and the torque $\tau_2$ calculated by the second-axis torque calculation unit 105b.

Figure 6:
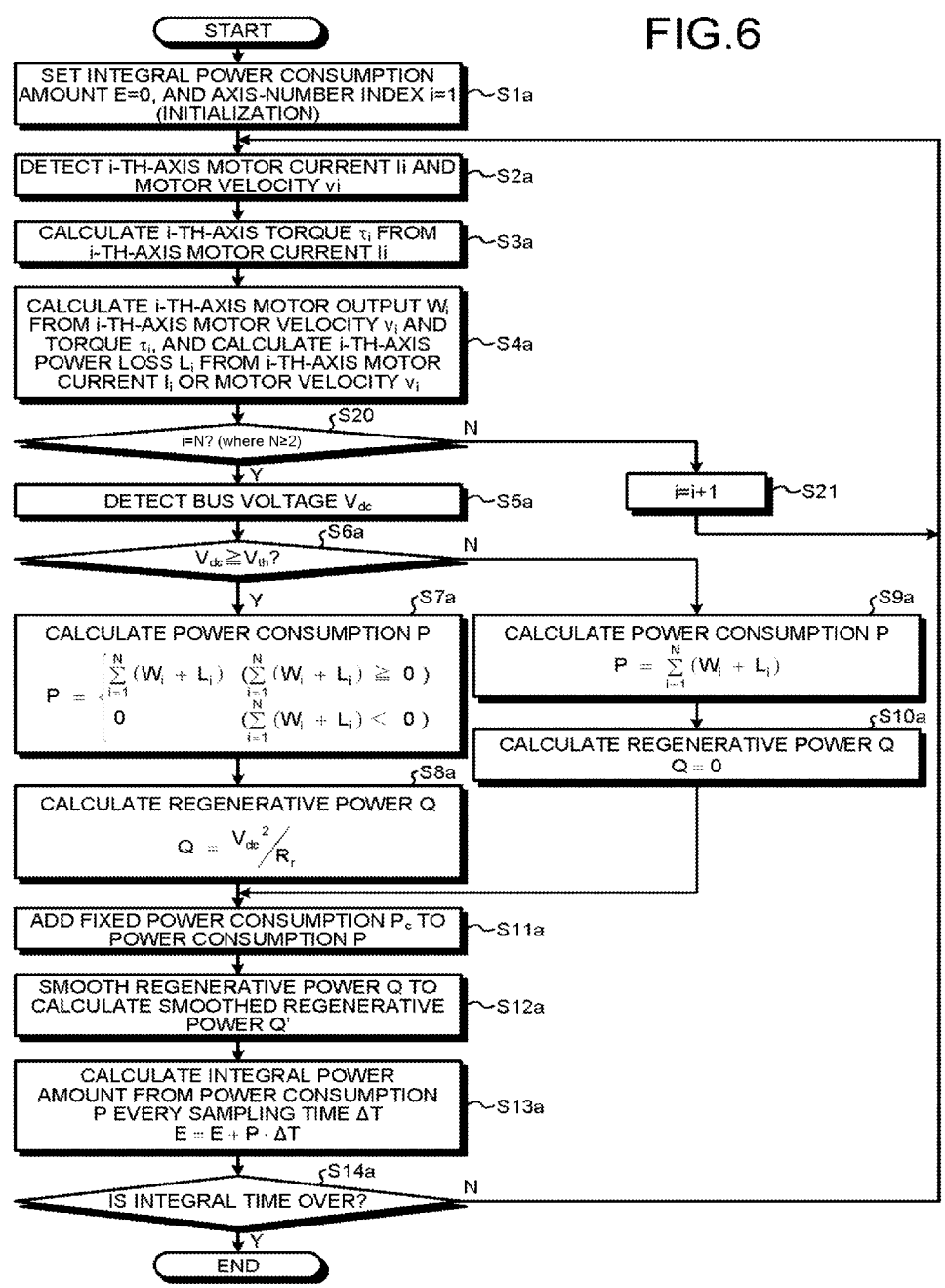
FIG. 6 is a flowchart for explaining an operation example of the motor control device according to the third embodiment.

Next, an operation of the motor control device at the time of driving the motors 101a and 101b is described with reference to FIG. 6. FIG. 6 is a flowchart for explaining an operation example of the motor control device according to the third embodiment of the present invention.

In FIG. 6, N (a natural number N≥2) inverters are connected to one rectifying unit, and N motors are driven. An axis-number index i is introduced.

First, the power-consumption calculation unit 5 sets the integral power amount E to 0, and sets the axis-number index to i=1 (Step S1a).

Next, an i-th-axis current detection unit 104i detects an i-th-axis motor current $I_i$, and an i-th-axis encoder 102i detects an i-th-axis motor velocity $v_i$ (Step S2a). In the present embodiment, "a" is added to the reference numeral of a constituent element of i=1 (the first axis), and "b" is added to the reference numeral of a constituent element of i=2 (the second axis). The same applies to other reference numerals. For example, a current detection unit on the first axis is described as "first-axis current detection unit 104a", and a current detection unit on the second axis is described as "second-axis current detection unit 104b". The processes in step S2a and the subsequent steps are performed at every sampling time $\Delta T$.

Next, an i-th-axis torque calculation unit 105i calculates an i-th-axis torque $\tau_i$ based on the i-th-axis motor current $I_i$ detected by the i-th-axis current detection unit 104i (Step S3a). It is sufficient that the torque $\tau_i$ is calculated in the manner as described in the first embodiment, and therefore descriptions of the calculation will be omitted.

Next, the power-consumption calculation unit 5 calculates an i-th-axis motor output $W_i$ from the i-th-axis motor velocity $v_i$ calculated by the i-th-axis encoder 102i, and the i-th-axis torque $\tau_i$ calculated by the i-th-axis torque calculation unit 105i, and calculates an i-th-axis power loss $L_i$ from the i-th-axis motor velocity $v_i$ and the i-th-axis motor current $I_i$ detected by the i-th-axis current detection unit 104i (Step S4a). It is adequate that a motor output and a power loss are calculated in the manner as described in the first embodiment, and therefore descriptions of the calculation will be omitted.

Next, the power-consumption calculation unit 5 determines whether or not the axis-number index i is N (Step S20). As a result of the determination, when the axis-number index i is not N, 1 is added to i, (Step S21), and then the operation of the motor control device returns to Step S2a. When i=N, the operation of the motor control device shifts to Step S5a.

Next, the bus-voltage measurement unit 11 detects the bus voltage $V_{dc}$ (Step S5a).

Subsequently, the power-consumption calculation unit 5 compares whether or not the bus voltage $V_{dc}$ calculated in step S5a is equal to or greater than a threshold value (Step S6a). As an example of the threshold value, a voltage at which the regenerative transistor 4 is set to ON, that is, the threshold voltage $V_{th}$ can be raised. When the bus voltage $V_{dc}$ is equal to or greater than the threshold voltage $V_{th}$ of the regenerative transistor 4, the regenerative transistor 4 is set to ON, and regenerative power is consumed by the regenerative resistance 3. If the bus voltage $V_{dc}$ is equal to or greater than the threshold voltage $V_{th}$ of the regenerative transistor 4, the operation of the motor control device shifts to Step S7a. If the bus voltage $V_{dc}$ is less than the threshold voltage $V_{th}$ of the regenerative transistor 4, the operation of the motor control device shifts to Step S9a.

<When Shifting to Step S7a>

The power-consumption calculation unit 5 calculates the power consumption P by the following equation (7) based on whether a total sum total of the first-axis to N-th-axis motor outputs W and the first-axis to N-th-axis power losses L, which are calculated in step S4a, is equal to or greater than 0, or is negative (Step S7a).

[Equation 7]

$$P = \begin{cases} \sum_{i=1}^{N}(W_i + L_i) & \left(\sum_{i=1}^{N}(W_i + L_i) \geq 0\right) \\ 0 & \left(\sum_{i=1}^{N}(W_i + L_i) < 0\right) \end{cases} \quad (7)$$

Subsequently, the power-consumption calculation unit 5 calculates the regenerative power $Q=V_{dc}^2/R_r$ (Step S8a), where the resistance value $R_r$ is a resistance value of the regenerative resistance 3. The resistance value $R_r$ is stored in the power-consumption calculation unit 5. Thereafter, the operation of the motor control device shifts to Step S11a.

<When Shifting to Step S9a>

The power-consumption calculation unit 5 uses the first-axis to N-th-axis motor outputs W and the first-axis to N-th-axis power losses L, which are calculated in step S4a, to calculate the power consumption P on the first axis to N-th axis by the following equation (8) (Step S9a).

[Equation 8]

$$P = \sum_{i=1}^{N}(W_i + L_i) \quad (8)$$

The power-consumption calculation unit 5 then calculates the regenerative power Q (Step S10a) to Q=0. Thereafter, the operation of the motor control device shifts to Step S11a.

<After Shifting to Step S11a>

Next, the power-consumption calculation unit 5 adds the fixed power consumption $P_c$ to the power consumption P calculated in step S7a or Step S9a in the same manner as in the first embodiment (Step S11a). Similarly to the first embodiment, when the fixed power consumption $P_c$ is very low for the power consumption P so that it is negligible, the fixed power consumption $P_c$ is considered as $P_c=0$, and Step S11a can be omitted.

Subsequently, the power-consumption calculation unit 5 uses the regenerative power Q and the previous regenerative power to smooth them in terms of time in order to calculate the smoothed regenerative power Q' (Step S12a). It is sufficient that the smoothing is performed by using a first-order lag filter or a moving average filter.

Subsequently, the power-consumption calculation unit 5 integrates the power consumption P to calculate the integral power amount E in the same manner as in the first embodiment (Step S13a).

Next, the power-consumption calculation unit 5 determines whether or not a cumulative time for calculating the integral power amount E has elapsed (Step S14a). When the cumulative time for calculating the integral power amount E has elapsed, the process is finished. When the integral time has not yet elapsed, the operation of the motor control device returns to Step S2a.

As described above, according to the flowchart in FIG. 6, the integral power amount E is calculated, which is a total sum of power amounts consumed during the integral time from the start of the process.

Furthermore, according to the flowchart in FIG. 6, the power consumption P, the regenerative power Q, average regenerative power Q', and the integral power amount E used by a motor and a motor driving device from the start of the process to the present point in time, can be obtained at every sampling time ΔT.

As described in the first embodiment, in which one inverter is connected to one rectifying unit to drive one motor (one-axis motor), whether the regenerative resistance 3 is in an energized state is determined based on whether a total value of the power loss L and the motor output W is positive or negative, and also based on the value of bus voltage.

As described in the present embodiment, in which N (N≥2) inverters are connected to one rectifying unit to drive N motors, each of the inverters is supplied with power from a common bus voltage (a voltage applied by the AC power supply 1, and rectified to a direct current by the rectifier 2 and the smoothing capacitor 10). Therefore, when the total value of the motor output W and the power loss L on any arbitrary axis is negative (that is, when regenerative power is produced in the motor and the inverter on that axis), it is possible to use this produced regenerative power for another axis through the common bus voltage.

For example, in the configuration of N=2, when the total $L_1+W_1$ of the first-axis power loss $L_1$ and the first-axis motor output $W_1$ is less than 0 ($L_1+W_1<0$), then regenerative power is produced on the first axis. Therefore, when the total $L_2+W_2$ of the second-axis power loss $L_2$ and the second-axis motor output $W_2$ is greater than 0 ($L_2+W_2>0$), then the regenerative power produced on the first axis can be used on the second axis.

In a case where the total of the motor outputs W and the power losses L on all the axes is negative, that is, in a case where $L_1+W_1+L_2+W_2<0$ in the above example with two axes, similarly to the first embodiment, when the regenerative resistance 3 is in an energized state, produced power is consumed by the regenerative resistance 3, and when the regenerative resistance 3 is not in an energized state, the produced power is accumulated in the smoothing capacitor 10. That is, whether produced power is consumed or accumulated is determined by the bus voltage $V_{dc}$ and the threshold voltage $V_{th}$ of the regenerative transistor 4.

That is, when $V_{dc}>V_{th}$, produced power is consumed by the regenerative resistance 3. According to the present invention, the power-consumption calculation takes into account power consumption in the regenerative resistance 3. This makes it possible to accurately calculate the power consumption.

On the contrary, when $V_{dc}<V_{th}$, produced power is not consumed by the regenerative resistance 3. Therefore, in the power-consumption calculation, the power consumption in the regenerative resistance 3 is considered as 0. This makes it possible to accurately calculate the power consumption. Particularly, when P<0, it is possible to calculate the power consumption accurately by taking into account power to be accumulated in the smoothing capacitor 10.

According to the present embodiment, a plurality of inverters are connected to one rectifying unit. Therefore, even when a plurality of motors are driven, the power consumption P, and a power consumption amount E to be consumed for a certain time, can still be calculated accurately by using an energization state of the regenerative resistance, while taking into account the amount of power to be accumulated in the smoothing capacitor, and the power consumption in the regenerative resistance.

In the above descriptions of the present embodiment, whether a regenerative resistance is in an energized state is determined by a magnitude relation of a threshold voltage between a bus voltage and a regenerative transistor, similarly to the first embodiment. However, in the present embodiment, similarly to the second embodiment, whether the regenerative resistance is in an energized state can be also determined by directly obtaining an ON/OFF state of the regenerative transistor, or based on whether the regenerative load ratio is 0 or greater than 0.

Fourth Embodiment

In the third embodiment, in order to drive motors on a plurality of axes, one rectifying unit and one smoothing capacitor output DC power, the DC power is used on the axes, and the power consumption at this time is calculated. However, the present invention is not limited thereto. In a fourth embodiment of the present invention, there is described a motor control device that includes a plurality of smoothing capacitors, each of which is provided to each individual inverter.

In the present embodiment, a plurality of motors are driven while the smoothing capacitors are shared by sharing a bus voltage.

Figure 7:
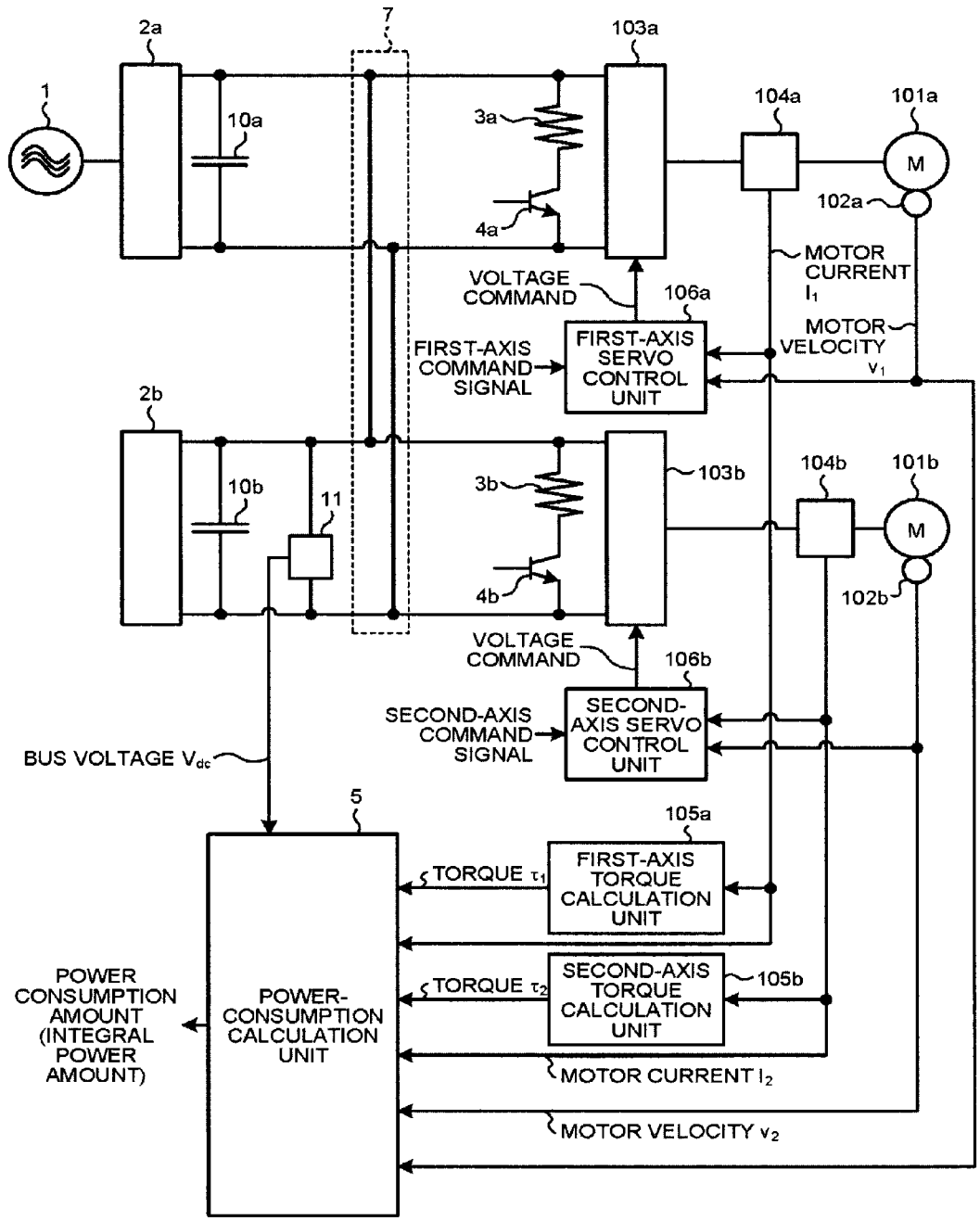
FIG. 7 is a block diagram illustrating a configuration example of a motor control device according to a fourth embodiment.

FIG. 7 is a block diagram illustrating a configuration example of a motor control device according to the fourth embodiment of the present invention. In FIG. 7, constituent elements denoted by the same reference signs as those in FIG. 1 or FIG. 5 have configurations identical to those in FIG. 1 or FIG. 5, and these elements have functions identical as those in FIG. 1 or FIG. 5.

In FIG. 5, bus-bars are configured in which one rectifying unit and one smoothing capacitor output DC power. However, in FIG. 7, a plurality of the motor control devices illustrated in FIG. 1 are provided (two in this example), and their bus-bars are connected to each other in parallel by a common wiring unit 7. The overall power consumption upon driving the motors in this configuration is calculated by the power-consumption calculation unit 5.

In the present embodiment, an AC power supply is not connected to a rectifier 2b, and a smoothing capacitor 10b and the inverter 103b are supplied with DC power through the common wiring unit 7. Further, the resistance value of a regenerative resistance 3a is represented as $R_{r1}$, and the resistance value of a regenerative resistance 3b is represented as $R_{r2}$. When the bus voltage becomes equal to or greater than a threshold value, regenerative transistors 4a and 4b are set to ON, and therefore power is consumed by the regenerative resistances 4a and 4b. When the bus voltage is less than the threshold value, the regenerative transistors 4a and 4b are maintained in an OFF state.

In the configuration in FIG. 7, a typical application example is a case where servo amplifiers or the like, each of which includes one rectifying unit, one smoothing capacitor, and one inverter unit, are connected to each other so as to share their bus-bars. The common wiring unit 7 connects between terminals of the smoothing capacitors in parallel, and therefore the bus voltage is shared between the inverters 103a and 103b. This makes it possible to use regenerative power, produced by one motor (for example, the motor 101a), in another motor (for example, the motor 101b). When this regenerative power is not used in another motor (for example, the motor 101b), it is possible to share this regenerative power between the connected smoothing capacitors in their entirety (both the smoothing capacitors 10a and 10b in FIG. 7). As more regenerative power is accumulated in the smoothing capacitors 10a and 10b, the bus voltage increases. When the bus voltage exceeds a threshold value, the regenerative transistors 4a and 4b are set to ON, and therefore excessive regenerative power is consumed by the regenerative resistances 3a and 3b.

Figure 8:
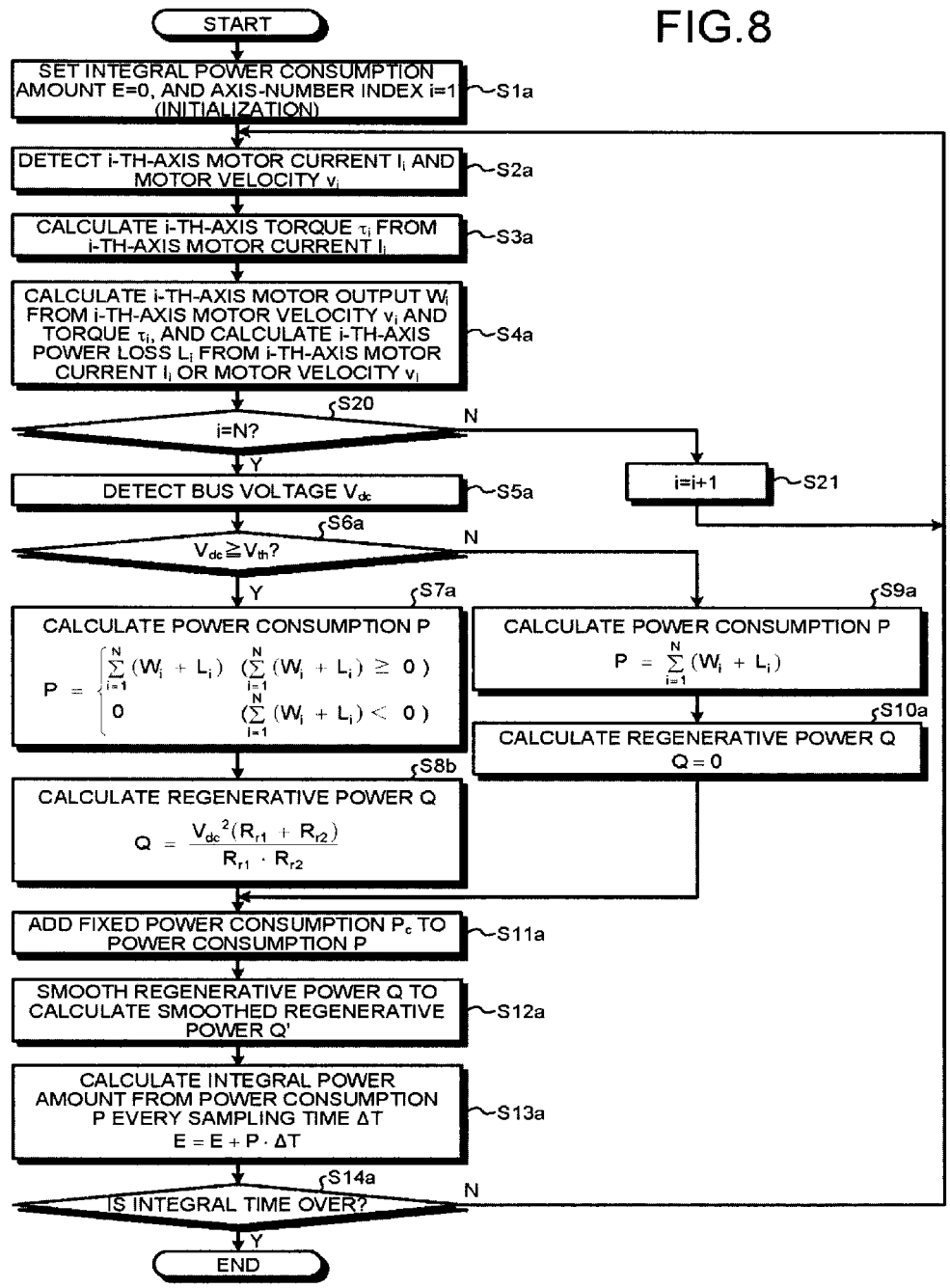
FIG. 8 is a flowchart for explaining an operation example of the motor control device according to the fourth embodiment.

Next, an operation of the motor control device is described with reference to FIG. 8. FIG. 8 is a flowchart for explaining an operation example of the motor control device according to the fourth embodiment of the present invention. In FIG. 8, in steps denoted by the same reference numerals as those in FIG. 6, the processes identical to those in FIG. 6 are performed. In the present embodiment, the bus voltage is shared between the inverters 103a and 103b, and regenerative power in each motor is also shared. Therefore, the power-consumption calculation is performed in the same manner as in the second embodiment. FIG. 8 is different from FIG. 6 in that the process in step S8b is performed instead of Step S8a in FIG. 6.

In FIG. 8, power consumption is calculated based on a total sum of respective motor outputs and power losses. This is because the bus voltage that is a power-supply source of each inverter is shared by using the common wiring unit 7, and regenerative power on one axis can be used as driving power for another axis. When the sum total value of the outputs and power losses is less than 0, the motors in their entirety are in a regenerative state. When the power consumption P becomes negative, the regenerative resistances 3a and 3b are determined not to be in an energized state in step S6a, and the regenerative power is accumulated in the smoothing capacitors 10a and 10b. Because at this time, the regenerative resistances 3a and 3b are not in an energized state, the regenerative power Q becomes equal to 0 (Q=0). When the bus voltage $V_{dc}$ is greater than the threshold voltage $V_{th}$ in step S6a, and the sum total value of respective motor outputs and power losses is equal to or greater than 0 in step S8b, then the sum total value is defined as power consumption. When the sum total value is smaller than 0, the power consumption is defined as 0. This corresponds to the fact that in step S6a, the regenerative resistances 3a and 3b are determined to be in an energized state, and therefore, when the sum total value is smaller than 0, that is, when the motors in their entirety are in a regenerative state, the regenerative power is determined to be consumed by the regenerative resistances 3a and 3b, and accordingly the power consumption becomes 0.

Furthermore, a combined resistance value $R_r = R_{r1} \cdot R_{r2} / (R_{r1} + R_{r2})$, when a plurality of regenerative resistances are connected in parallel, is calculated to calculate the regenerative power Q based on this combined resistance value $R_r$. This process corresponds to Step S8b in the flowchart illustrated in FIG. 8.

In the motor control device illustrated in FIG. 7, two regenerative resistances are connected in parallel to a bus voltage. However, even when three or more regenerative resistance are connected, their combined resistance value can be calculated and used.

Thereafter, similarly to FIG. 6, the fixed power consumption $P_c$ is added to the power consumption P to calculate the smoothed regenerative power Q', and the power consumption P is integrated to calculate the integral power amount E. In the present embodiment, similarly to FIG. 6, when the bus voltage $V_{dc}$ is less than a threshold voltage of a regenerative transistor, and when the power consumption P in the motors in their entirety is negative, then this negative power consumption P is defined as regenerative power, and this regenerative power is accumulated in the smoothing capacitors 10a and 10b. Therefore, the power consumption P, the integral power amount E, and the regenerative power Q can be calculated accurately.

In the motor control device illustrated in FIG. 7, similarly to the motor control device illustrated in FIG. 5, the bus voltage is shared between respective inverter units and respective motors. Therefore, regenerative power produced by one motor can be used in another motor, and also the regenerative power can be accumulated in the smoothing capacitors 10a and 10b. As the regenerative power is accumulated in the smoothing capacitors 10a and 10b, the bus voltage increases. When the bus voltage becomes equal to or greater than a threshold voltage, the regenerative transistors 4a and 4b are in an energized state, and the regenerative power is consumed by the regenerative resistances 3a and 3b. Therefore, when the bus-bars are shared by using the common wiring unit 7, the power consumption of a plurality of motors and motor driving devices can be calculated by the same method as described in the third embodiment, even though a plurality of the smoothing capacitors 10a and 10b are present.

Figure 9:
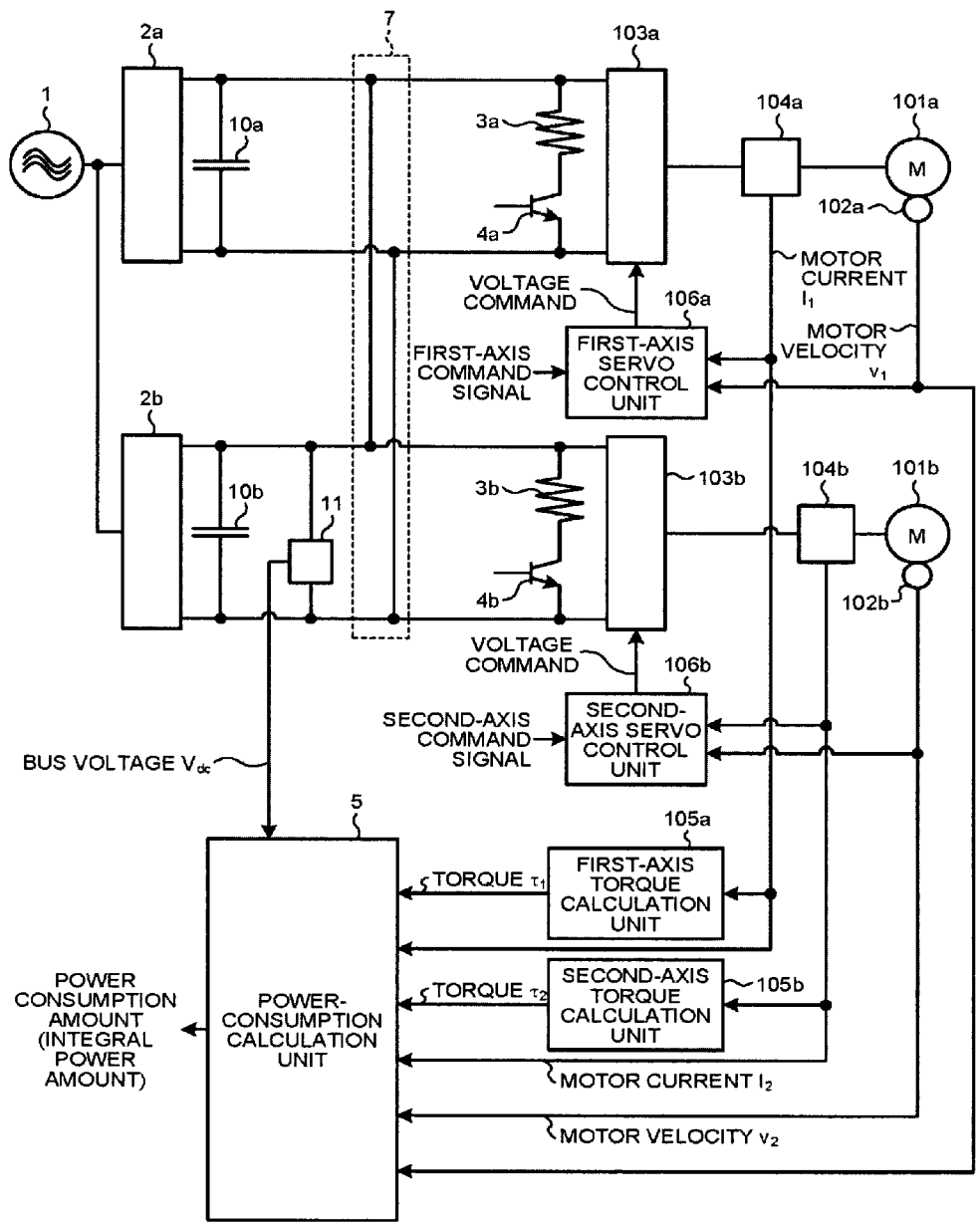
FIG. 9 is a block diagram illustrating a configuration example of the motor control device according to the fourth embodiment.

In the descriptions of the present embodiment, the AC power supply 1 is not connected to the rectifier 2b, and only DC power rectified by a rectifier 2a is supplied to the inverter units and the smoothing capacitors through the common wiring unit 7. However, as illustrated in FIG. 9, the AC power supply 1 can be connected to both the rectifiers 2a and 2b. Or it can be arranged such that the rectifier 2b is not provided as illustrated in FIG. 10 by removing the rectifier 2b from the motor control device illustrated in FIG. 7. Also in FIGS. 9 and 10, the bus voltage is shared by using the common wiring unit 7, and regenerative power in each motor is accumulated in both the smoothing capacitors 10a and 10b, and shared therebetween. Therefore, the motor control device in FIGS. 9 and 10 also has effects identical to those of the motor control device with the configuration described in FIG. 7.

Furthermore, while the present embodiment has described a case of using two axe, three or more axes can be also applied as long as a plurality of smoothing capacitors are connected to each other at both ends through a common wiring unit, and a bus voltage for a plurality of axes can be shared among the axes. Furthermore, the number of motors and the number of inverter units are not necessarily equal to the number of smoothing capacitors. The number of smoothing capacitors can be greater or smaller than the number of motors and the number of inverter units. Even in such a case, because the bus voltage is shared by using the common wiring unit 7, regenerative power produced by one motor is used in another motor, or the regenerative power is accumulated in the smoothing capacitors, and when the bus voltage is equal to or greater than a threshold voltage, a regenerative resistance is in an energized state, and the regenerative power is consumed. This point is common to the motor control device described in FIG. 7, and therefore the motor control device in FIGS. 9 and 10 has effects identical to those of the motor control device in FIG. 7.

INDUSTRIAL APPLICABILITY

As described above, the motor control device according to the present invention is useful for controlling a motor driving device such as a servo amplifier.

REFERENCE SIGNS LIST

1 AC power supply, 2, 2a, 2b rectifier, 3, 3a, 3b regenerative resistance, 4, 4a, 4b regenerative transistor, 5 power-consumption calculation unit, 10, 10a, 10b smoothing capacitor, 11 bus-voltage measurement unit, 101, 101a, 101b motor, 102, 102a, 102b encoder, 103, 103a, 103b inverter, 104, 104a, 104b current detection unit, 105, 105a, 105b torque calculation unit, 106, 106a, 106b servo control unit, S1 to S14, S1a to S14a, S8b, S20, S21 step.

The invention claimed is:
1. A motor control device comprising:
a rectifier to convert power from an AC power supply to DC power, and output the DC power;
a smoothing capacitor for main-circuit smoothing that is connected to an output of the rectifier;
a regenerative resistance, one terminal of which is connected to one of electrodes of the smoothing capacitor, and which consumes regenerative power;
an inverter to convert DC power output from the rectifier to AC power suitable for driving a motor;
a current detector to detect a motor current of the motor, the current detector being connected between the motor and the inverter;
a velocity calculator to calculate a motor velocity of the motor;
a torque calculator to calculate a torque or thrust force of the motor according to the motor current;
a servo controller to provide a voltage command to the inverter from various types of command information; and
a power-consumption calculator to calculate a power loss based on the motor current or based on the motor current and the motor velocity, and calculate a motor output obtained from a product of the motor velocity and the torque or thrust force, so as to determine whether or not the regenerative resistance is in an energized state, wherein
when the regenerative resistance is in an energized state, if a total value of the power loss and the motor output is equal to or greater than 0, the power-consumption calculator calculates power consumption as the total value, and when the total value of the power loss and the motor output is negative, the power-consumption calculator calculates the power consumption as 0, and
when the regenerative resistance is not in an energized state, the power-consumption calculator calculates the power consumption as the total value of the power loss and the motor output.

2. The motor control device according to claim 1, wherein
when the regenerative resistance is in an energized state, the power-consumption calculator defines the regenerative power as a value obtained by dividing a square of a bus voltage by a resistance value of a regenerative resistance, and
when the regenerative resistance is not in an energized state, the power-consumption calculator defines the regenerative power as 0.

3. The motor control device according to claim 2, wherein after calculating the regenerative power, the power-consumption calculator smooths the regenerative power in terms of time in order to calculate smoothed regenerative power.

4. The motor control device according to claim 1, wherein the power-consumption calculator integrates the calculated power consumption to calculate an integral power amount.

5. The motor control device according to claim 1, wherein the power-consumption calculator adds a fixed power consumption to the power consumption in order to calculate an overall power consumption, where the fixed power consumption is power consumption of an electronic component that cannot use the regenerative power.

6. The motor control device according to claim 5, wherein the power-consumption calculator integrates the calculated overall power consumption to calculate an integral power amount.

7. The motor control device according to claim 1, wherein when a bus voltage output from the rectifier is equal to or greater than a threshold value, the power-consumption calculator determines that the regenerative resistance is in an energized state and performs a regenerative operation, and when the bus voltage is less than the threshold value, the power-consumption calculator determines that the regenerative resistance is not in an energized state or does not perform a regenerative operation.

8. The motor control device according to claim 1, wherein
when a regenerative transistor, which is connected to the regenerative resistance in series, is in an ON state, the power-consumption calculator determines that the regenerative resistance performs a regenerative operation, and
when the regenerative transistor is in an OFF state, the power-consumption calculator determines that the regenerative resistance does not perform a regenerative operation.

9. The motor control device according to claim 1, wherein
the power-consumption calculator calculates a regenerative load ratio,
when the regenerative load ratio is greater than 0, the power-consumption calculator determines that the regenerative resistance performs a regenerative operation, and
when the regenerative load ratio is 0, the power-consumption calculator determines that the regenerative resistance does not perform a regenerative operation.

10. A motor control device comprising:
a rectifier to convert power from an AC power supply to DC power, and output the DC power;
a smoothing capacitor for main-circuit smoothing that is connected to an output of the rectifier;
a regenerative resistance, one terminal of which is connected to one of electrodes of the smoothing capacitor, and which consumes regenerative power;
N inverters, each of which is configured to convert DC power output from the rectifier to AC power suitable for driving the corresponding motor on each axis, where N is a natural number equal to or larger than 2;
N current detectors to detect a motor current of the corresponding motor, the current detectors being connected between the corresponding motor and the corresponding inverter;
N velocity calculators, each of which is configured to calculate a motor velocity of the corresponding motor;
N torque calculators, each of which is configured to calculate a torque or thrust force produced in the corresponding motor according to the corresponding motor current;
N servo controllers, each of which is configured to provide a voltage command to the corresponding inverter based on various types of command information; and
a power-consumption calculator to calculate power losses based on the respective motor currents or according to the respective motor currents and the motor velocities, and calculate motor outputs from a product of the respective motor velocities and the respective torques or thrust forces, so as to determine whether the regenerative resistances is in an energized state, wherein
when the regenerative resistances is in an energized state, if an overall total value of the power losses and the motor outputs is equal to or greater than 0, the power-consumption calculator calculates power consumption as the overall total value, and if the overall the total value of the power losses and the motor outputs is negative, the power-consumption calculator calculates the power consumption as 0, and
when the regenerative resistances is not in an energized state, the power-consumption calculator calculates the power consumption as the overall total value of the power losses and the motor outputs.

11. The motor control device according to claim 10, wherein
when the regenerative resistance is in an energized state, the power-consumption calculator defines the regenerative power as a value obtained by dividing a square of a bus voltage by a resistance value of a regenerative resistance, and
when the regenerative resistance is not in an energized state, the power-consumption calculator defines the regenerative power as 0.

12. The motor control device according to claim 10, wherein the power-consumption calculator integrates the calculated power consumption to calculate an integral power amount.

13. The motor control device according to claim 10, wherein the power-consumption calculator adds a fixed power consumption to the power consumption, in order to calculate an overall power consumption, where the fixed power consumption is power consumption of an electronic component that cannot use the regenerative power.

14. The motor control device according to claim 10, wherein when a bus voltage output from the rectifier is equal to or greater than a threshold value, the power-consumption calculator determines that the regenerative resistance is in an energized state and performs a regenerative operation, and when the bus voltage is less than the threshold value, the power-consumption calculator determines that the regenerative resistance is not in an energized state or does not perform a regenerative operation.

15. The motor control device according to claim 10, wherein
when a regenerative transistor, which is connected to the regenerative resistance in series, is in an ON state, the power-consumption calculator determines that the regenerative resistance performs a regenerative operation, and
when the regenerative transistor is in an OFF state, the power-consumption calculator determines that the regenerative resistance does not perform a regenerative operation.

16. The motor control device according to claim 10, wherein
the power-consumption calculator calculates a regenerative load ratio, when the regenerative load ratio is greater than 0, the power-consumption calculator determines that the regenerative resistance performs a regenerative operation, and when the regenerative load ratio is 0, the power-consumption calculator determines that the regenerative resistance does not perform a regenerative operation.

17. A motor control device comprising:

one or a plurality of rectifiers, each of which is configured to convert power from an AC power supply to DC power, and output the DC power;

a plurality of smoothing capacitors for main-circuit smoothing, each of which is connected to an output of the corresponding rectifier;

a plurality of regenerative resistances, one terminal of each of which is connected to one of electrodes of the corresponding one of the smoothing capacitors, and consumes regenerative power;

a plurality of common wires to connect both ends of the respective smoothing capacitors in parallel to share a bus voltage;

N inverters, each of which is configured to convert DC power supplied from the shared bus voltage to AC power suitable for driving the corresponding motor on each axis, where N is a natural number equal to or larger than 2;

N current detectors to detect a motor current of the corresponding motor, each of the N current detectors being connected between the corresponding motor and the corresponding inverter;

N velocity calculators, each of which is configured to calculate a motor velocity of the corresponding motor;

N torque calculators, each of which is configured to calculate a torque or thrust force produced in the corresponding motor according to the corresponding motor current;

N servo controllers, each of which is configured to provide a voltage command to the corresponding inverter based on various types of command information; and a power-consumption calculator to calculate power losses based on the respective motor currents or according to the respective motor currents and the motor velocities, and calculate motor outputs from a product of the respective motor velocities and the respective torques or thrust forces, so as to determine whether the regenerative resistances are respectively in an energized state, wherein when the regenerative resistances are in an energized state, if an overall total value of the power losses and the motor outputs is equal to or greater than 0, the power-consumption calculator calculates a power consumption as the overall total value, and if the overall the total value of the power losses and the motor outputs is negative, the power-consumption calculator calculates the power consumption as 0, and when the regenerative resistances are not in an energized state, the power-consumption calculator calculates the power consumption as the overall total value of the power losses and the motor outputs.

18. The motor control device according to claim 17, wherein when the regenerative resistance is in an energized state, the power-consumption calculator defines the regenerative power as a value obtained by dividing a square of a bus voltage by a combined resistance value of a plurality of regenerative resistances, and when the regenerative resistance is not in an energized state, the power-consumption calculator defines the regenerative power as 0.

19. The motor control device according to claim 17, wherein the power-consumption calculator integrates the calculated power consumption to calculate an integral power amount.

20. The motor control device according to claim 17, wherein the power-consumption calculator adds a fixed power consumption to the power consumption in order to calculate an overall power consumption, where the fixed power consumption is power consumption of an electronic component that cannot use the regenerative power.

21. The motor control device according to claim 17, wherein when the bus voltage output from the rectifier is equal to or greater than a threshold value, the power-consumption calculator determines that the regenerative resistance is in an energized state and performs a regenerative operation, and when the bus voltage is less than the threshold value, the power-consumption calculator determines that the regenerative resistance is not in an energized state or does not perform a regenerative operation.

22. The motor control device according to claim 17, wherein when a regenerative transistor, which is connected to the regenerative resistance in series, is in an ON state, the power-consumption calculator determines that the regenerative resistance performs a regenerative operation, and when the regenerative transistor is in an OFF state, the power-consumption calculator determines that the regenerative resistance does not perform a regenerative operation.

23. The motor control device according to claim 17, wherein the power-consumption calculator calculates a regenerative load ratio, when the regenerative load ratio is greater than 0, the power-consumption calculator determines that the regenerative resistance performs a regenerative operation, and when the regenerative load ratio is 0, the power-consumption calculator determines that the regenerative resistance does not perform a regenerative operation.

* * * * *